US011858723B2

(12) United States Patent
Fletcher et al.

(10) Patent No.: US 11,858,723 B2
(45) Date of Patent: Jan. 2, 2024

(54) MODULAR PORTABLE STORAGE CONTAINER SYSTEM

(71) Applicant: QT-System LLC, Fenton, MI (US)

(72) Inventors: Stuart Fletcher, Linden, MI (US); Scott Owen, Columbiaville, MI (US)

(73) Assignee: QT-System LLC, Fenton, MI (US)

( * ) Notice: Subject to any disclaimer, the term of this patent is extended or adjusted under 35 U.S.C. 154(b) by 329 days.

(21) Appl. No.: 17/410,412

(22) Filed: Aug. 24, 2021

(65) Prior Publication Data

US 2023/0061865 A1    Mar. 2, 2023

(51) Int. Cl.
| | | |
|---|---|---|
| *B65D 88/00* | (2006.01) | |
| *B65D 90/18* | (2006.01) | |
| *B65D 90/66* | (2006.01) | |
| *B60R 9/06* | (2006.01) | |
| *B60R 3/02* | (2006.01) | |

(52) U.S. Cl.
CPC .............. *B65D 88/005* (2013.01); *B60R 3/02* (2013.01); *B60R 9/065* (2013.01); *B65D 90/18* (2013.01); *B65D 90/66* (2013.01); *B65D 2590/666* (2013.01)

(58) Field of Classification Search
CPC ...... B65D 88/005; B65D 90/18; B65D 90/66; B65D 2590/666; B60R 3/02; B60R 9/065
USPC ........................................................... 220/8
See application file for complete search history.

(56) References Cited

U.S. PATENT DOCUMENTS

| | | | | |
|---|---|---|---|---|
| 3,061,134 A | * | 10/1962 | Fesmire ............. | B65D 90/0033 220/4.27 |
| 3,144,141 A | * | 8/1964 | Tantlinger ............. | B60P 1/6481 193/41 |
| 3,989,162 A | * | 11/1976 | Hodge ................... | B65D 43/24 220/817 |
| 4,182,530 A | | 1/1980 | Hodge | |
| 4,726,486 A | | 2/1988 | Masuda | |
| 8,985,365 B2 | | 3/2015 | Chuang | |
| 10,308,423 B1 | * | 6/2019 | Cui ....................... | B65D 90/027 |
| 11,485,573 B1 | * | 11/2022 | Melancon, Jr. ...... | B65D 88/542 |

(Continued)

FOREIGN PATENT DOCUMENTS

| | | | | |
|---|---|---|---|---|
| CN | 104325939 B | | 5/2016 | |
| FR | 2837806 A1 | * | 10/2003 | ............. B60J 7/041 |

(Continued)

*Primary Examiner* — J. Gregory Pickett
*Assistant Examiner* — Niki M Eloshway
(74) *Attorney, Agent, or Firm* — Vivacqua Crane PLLC

(57) ABSTRACT

A modular portable storage container system includes a storage container having first and second sections. The first section defines a first partial volume of storage space and the second section defines a second partial volume of storage space. The system further includes a lock mechanism with a lock arm, lock handle, and pivot shaft defining an axis of rotation. The lock arm and handle are fixed for common rotation with the pivot shaft. The arm extends radially outward from the pivot shaft to a roller assembly. A lock track is disposed within the second section and extends from a fluted open portion to a closed end, with a continuous track portion disposed therebetween. The first and second sections are movable between at least closed and open positions. In the closed position, the roller assembly engages with the lock track and retains the first section in contact with the second portion.

20 Claims, 4 Drawing Sheets

(56) References Cited

U.S. PATENT DOCUMENTS

| | | | |
|---|---|---|---|
| 2006/0032850 A1 | 2/2006 | Theriot et al. | |
| 2009/0078700 A1 | 3/2009 | Boivin | |
| 2013/0284730 A1 | 10/2013 | Kohlgrüber | |
| 2014/0190963 A1 | 7/2014 | Skeid | |
| 2015/0375929 A1 | 12/2015 | Hamilton et al. | |
| 2018/0086186 A1* | 3/2018 | Haag | B60P 1/28 |
| 2019/0152691 A1 | 5/2019 | Wegener | |
| 2020/0262646 A1* | 8/2020 | Boesch | B65D 90/582 |
| 2021/0188532 A1 | 6/2021 | Trout et al. | |

FOREIGN PATENT DOCUMENTS

| | | |
|---|---|---|
| GB | 2008064 A | 5/1979 |
| WO | 9511608 A1 | 5/1995 |
| WO | 2016113588 A1 | 7/2016 |
| WO | 2020209876 A1 | 10/2020 |

* cited by examiner

MODULAR PORTABLE STORAGE CONTAINER SYSTEM

INTRODUCTION

The present disclosure relates to containers, and more specifically to containers for storage and transport of a wide variety of objects in various applications.

Vehicle users often use cargo compartments within their vehicles to move cargo, packages, and objects more generally, from place to place. Typically, a vehicle user will manually load a cargo compartment within their vehicle with those cargo, packages, and other objects. In some instances, mechanical or automated devices may assist in such loading and/or unloading of the vehicle cargo compartments. While current systems and methods for loading and unloading vehicle cargo compartments certainly continue to work, there is a need in the art for a simplified system that reduces the number of times that a user must interact with the cargo before, during, and after transit to a use or delivery location. Likewise, there is a need in the art for a scalable, high portability storage system that can be safely and securely used in a wide variety of fields of endeavor, including but not limited to private, industrial, and warehouse applications. Further, there is a need in the art for a scalable high-portability storage system that can be manufactured at relatively low cost, with low complexity.

SUMMARY

According to an aspect of the present disclosure a modular portable storage container system includes a first container section defining a first partial volume of storage space and a second container section defining a second partial volume of storage space. The first and second container sections are movable between at least a closed position and an open position. In the open position, the first and second container sections are separated from one another, and in the closed position the first and second container sections are in contact with one another such that the first and second partial volumes combine to define a full volume of enclosed storage space. The system further includes a lock mechanism having a lock arm disposed within the first container section, a lock handle disposed on the first container section, and a pivot shaft defining an axis of rotation. The lock arm and lock handle are fixed for common rotation with the pivot shaft. The lock arm extends radially outward from the pivot shaft to a roller assembly. The lock mechanism further includes a lock track disposed within the second container section. The lock track extends from a fluted open portion to a closed end, with a continuous track portion disposed therebetween. In the closed position, the roller assembly engages with the lock track and retains the first container section in contact with the second container section.

In an additional aspect of the present disclosure the first container section further includes a first end portion, a first wall portion, and a second end portion. The first end portion is affixed at a first connection surface with the first wall portion. The first wall portion extends from the first connection surface to a second connection surface opposite the first connection surface. The second end portion is affixed to the first wall portion at the second connection surface so that the first end portion is disposed opposite and parallel to the second end portion. The second container section further includes a third end portion, a second wall portion, and a fourth end portion. The third end portion is affixed at a third connection surface with the second wall portion. The second wall portion extends from the second connection surface to a fourth connection surface opposite the third connection surface. The third end portion is affixed to the second wall portion at the fourth connection surface so that the third end portion is disposed opposite and parallel to the fourth end portion.

In another aspect of the present disclosure the first wall portion and the second wall portion each further include a horizontal base portion and a vertical portion positioned orthogonally overtop the horizontal base portion and affixed to the horizontal base portion. The horizontal base portion and the vertical portion extend from the first end portion to the second end portion of the first wall portion, and extend from the third end portion to the fourth end portion of the second wall portion.

In yet another aspect of the present disclosure the horizontal base portion further defines a concave arcuate shape extending from the first end portion to the second end portion of the first wall portion, and extending from the third end portion to the fourth end portion of the second wall portion. The concave arcuate shape further includes at least two inset sections sized and shaped to fit around wheel well intrusions in a vehicle cargo compartment so that the portable storage container is reversibly stowable within the vehicle cargo compartment.

In still another aspect of the present disclosure at least a portion of the lock track is disposed within the first container section. The lock track in each of the first and second container sections is disposed within a hollow portion of the first and second container sections, respectively.

In yet another aspect of the present disclosure the system further includes a plurality of casters affixed to a bottom surface of each of the first and second container sections.

In still another aspect of the present disclosure the system further includes a blocking frame. The blocking frame is sized and shaped to fit within a vehicle cargo compartment and to secure the first and second container sections in the open position, the blocking frame further including a lock bar. The lock bar is rotatably mounted to the blocking frame between the first and second container sections, and the lock bar is rotatable between at least a locked position and an unlocked position.

In yet another aspect of the present disclosure in the locked position the lock bar physically contacts each of the first and second container sections to lock the first and second container sections in the open position and prevents lateral movement of the first and second container sections. In the unlocked position the lock bar rotates away from the first and second container sections to allow free movement of the first and second container sections.

In still another aspect of the present disclosure the blocking frame further includes a front frame portion, a rear frame portion connected to the front frame portion by a plurality of longitudinal bars, and one or more blocking members. The one or more blocking members form a narrow door frame in the front frame portion. The one or more blocking members prevent longitudinal movement of the first and second container sections within a vehicle while allowing a user to pass into a space between the first and second container sections when the first and second container sections are in the open position. The rear frame portion defines a wide door frame. The wide door frame is larger than the narrow door frame. The wide door frame is sized to allow passage of the first and second container sections when the first and second container sections are in the closed position. The rear frame portion prevents longitudinal movement of the first and second container sections within a vehicle when the first and second containers sections are in the open position.

In yet another aspect of the present disclosure the system further includes a ramp. The ramp has a plurality of extendable sections. At least one of the plurality of extendable sections is rotatably affixed to a vehicle proximate a vehicle tailgate opening. The concave arcuate shape extending from the first end portion to the second end portion of the first wall portion, and extending from the third end portion to the fourth end portion of the second wall portion is sized and shaped to pass over an angle defining a slope of the ramp relative to a floor of the vehicle cargo compartment such that the horizontal base portion does not contact the ramp or the vehicle cargo compartment while the first and second container sections are moved.

In still another aspect of the present disclosure a modular portable storage container system includes a portable storage container having at least a first container section and a second container section, the first container section defining a first partial volume of storage space and the second container section defining a second partial volume of storage space. The system further includes a lock mechanism having a lock arm disposed within the first container section, a lock handle disposed externally to the first container section, a pivot shaft defining an axis of rotation, the lock arm and the lock handle fixed for common rotation with the pivot shaft. The lock arm extends radially outward from the pivot shaft to a roller assembly. The lock mechanism further includes a lock track disposed within the second container section. The lock track extends from a fluted open portion to a closed end, with a continuous track portion disposed therebetween. The first container section and the second container section are movable between at least closed position and an open position. In the closed position, the roller assembly engages with the lock track and retains the first container section in contact with the second container section.

In yet another aspect of the present disclosure in the open position, the first and second container sections are separated from one another, and in the closed position the first and second container sections are in contact with one another such that the first and second partial volumes combine to define a full volume of storage space.

In still another aspect of the present disclosure the first container section further includes a first end portion, a first wall portion, and a second end portion. The first end portion is affixed at a first connection surface with the first wall portion. The first wall portion extends from the first connection surface to a second connection surface opposite the first connection surface. The second end portion is affixed to the first wall portion at the second connection surface so that the first end portion is disposed opposite and parallel to the second end portion. The second container section further includes a third end portion, a second wall portion, and a fourth end portion. The third end portion is affixed at a third connection surface with the second wall portion. The second wall portion extends from the second connection surface to a fourth connection surface opposite the third connection surface. The third end portion is affixed to the second wall portion at the fourth connection surface so that the third end portion is disposed opposite and parallel to the fourth end portion.

In yet another aspect of the present disclosure the first and second wall portions further include a horizontal base portion and a vertical portion positioned orthogonally overtop the horizontal base portion. The vertical portion is affixed to the horizontal base portion. The horizontal base portion and the vertical portion extend from the first end portion to the second end portion of the first wall portion, and extend from the third end portion to the fourth end portion of the second wall portion.

In still another aspect of the present disclosure the horizontal base portion further defines a concave arcuate shape extending from the first end portion to the second end portion of the first wall portion, and extending from the third end portion to the fourth end portion of the second wall portion. A plurality of casters are affixed to a bottom surface of the horizontal base portion. The concave arcuate shape further includes at least two inset sections sized and shaped to fit around wheel well intrusions in a vehicle cargo compartment so that the portable storage container is reversibly stowable within the vehicle cargo compartment.

In yet another aspect of the present disclosure the lock track further includes a storage section of lock track disposed within a hollow portion of the first container section. The fluted open portion, the continuous track portion, and the closed end are disposed within a hollow portion of the second container section.

In still another aspect of the present disclosure the system further includes a blocking frame. The blocking frame sized and shaped to fit within a vehicle cargo compartment and to secure the first and second container sections in the open position, the blocking frame further including a lock bar. The lock bar is rotatably mounted to the blocking frame between the first and second container sections. The lock bar is rotatable between at least a locked bar position and an unlocked bar position. In the locked bar position the lock bar physically contacts each of the first and second container sections to lock the first and second container sections in the open position and prevents lateral movement of the first and second container sections. In the unlocked bar position the lock bar rotates away from the first and second container sections to allow free movement of the first and second container sections.

In yet another aspect of the present disclosure the blocking frame further includes a front frame portion and a rear frame portion connected to the front frame portion by a plurality of longitudinal bars. One or more blocking members form a narrow door frame in the front frame portion. The one or more blocking members prevent longitudinal movement of the first and second container sections within a vehicle while allowing a user to pass into a space between the first and second container sections when the first and second container sections are in the open position. The rear frame portion defines a wide door frame, the wide door frame being larger than the narrow door frame, the wide door frame being sized to allow passage of the first and second container sections when the first and second container sections are in the closed position.

In still another aspect of the present disclosure the system further includes a ramp, the ramp having a plurality of extendable sections. At least one of the plurality of extendable sections is rotatably affixed to a vehicle proximate a vehicle tailgate opening. The concave arcuate shape of the horizontal base portion is sized and shaped to pass over an angle defining a slope of the ramp relative to a floor of the vehicle cargo compartment such that the horizontal base portion does not contact the ramp or the vehicle cargo compartment while the first and second container sections are moved.

In yet another aspect of the present disclosure, a modular portable storage container system includes a first container section and a second container section. The first and second container sections each define a partial storage volume. The partial storage volumes of the first and second container sections facing and spaced apart from one another in an open position, and the first and second container sections facing and in contact with one another and forming a complete storage volume in a closed position. The first container section includes a first end portion, a first wall portion affixed to the first end portion at a first connecting surface, and a second end portion affixed to the first wall portion at a second connecting surface. The first connecting surface disposed opposite the second connecting surface. The first end portion and the second end portion of the first container section each have a first lock mechanism portion including a rotatable handle, a pivot shaft defining an axis of rotation and extending from the rotatable handle disposed on the first end portion through the first wall portion to the rotatable handle disposed on the second end portion. The rotatable handles disposed on the first and second end portions are each fixed for common rotation with and rotate about the pivot shaft and extend radially outward from the pivot shaft. A lock arm is disposed within a hollow portion of the first and second end portions and is also fixed for common rotation with the rotatable handle, and the pivot shaft, the lock arm extending radially outward from the pivot shaft and terminating at a roller assembly. The second container section includes a third end portion, a second wall portion affixed to the third end portion at a third connecting surface, and a fourth end portion affixed to the second wall portion at a fourth connecting surface. The third connecting surface is disposed opposite the fourth connecting surface. The third end portion and the fourth end portion of the second container section each have a second lock mechanism portion including a lock track disposed within a hollow portion of the third and fourth end portions. The lock track extends from a fluted open portion to a closed end, with a continuous track portion disposed therebetween. In the closed position, the roller assembly engages with the lock track and retains the first container section in contact with the second container section.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In the text that follows, including in the claims and specification, certain elements are designated as "first", "second", "third", "fourth", and so forth. These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function.

Figure 1:
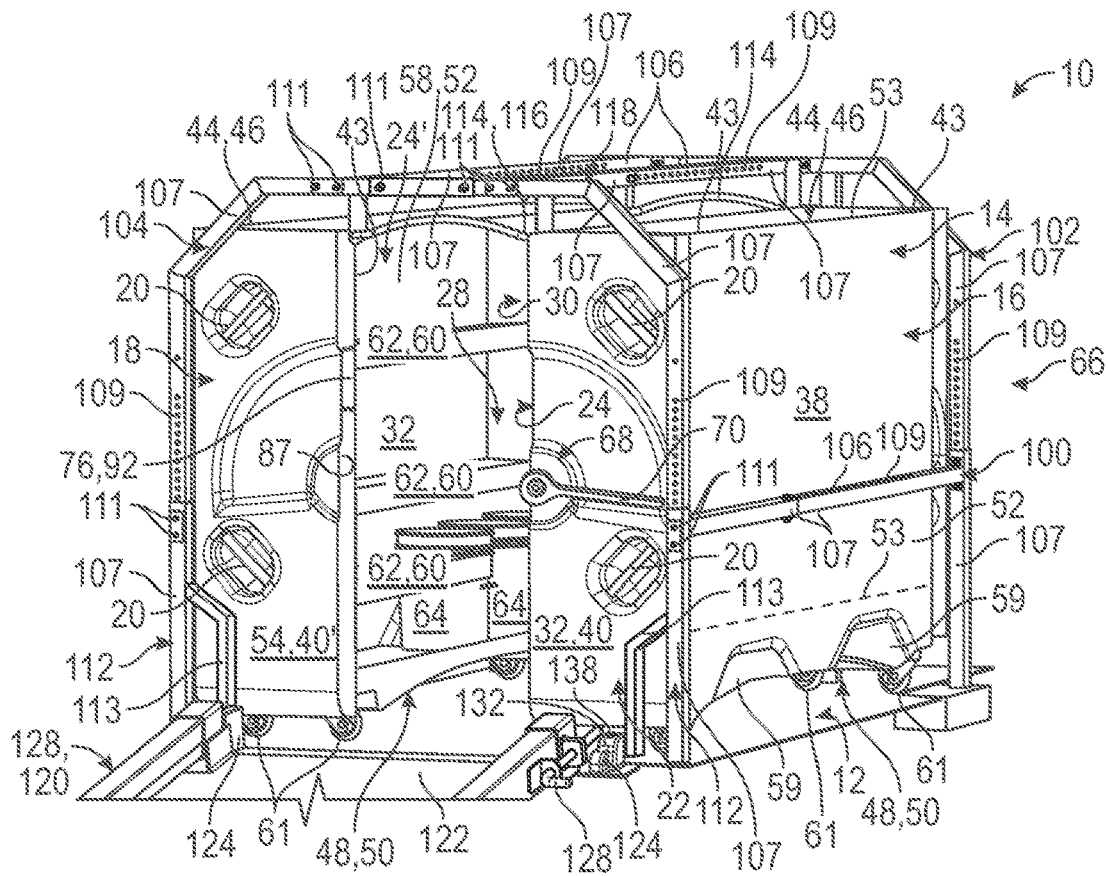
FIG. 1 is a partial perspective rear view of a modular portable storage container system according to an aspect of the present disclosure.
Figure 2:
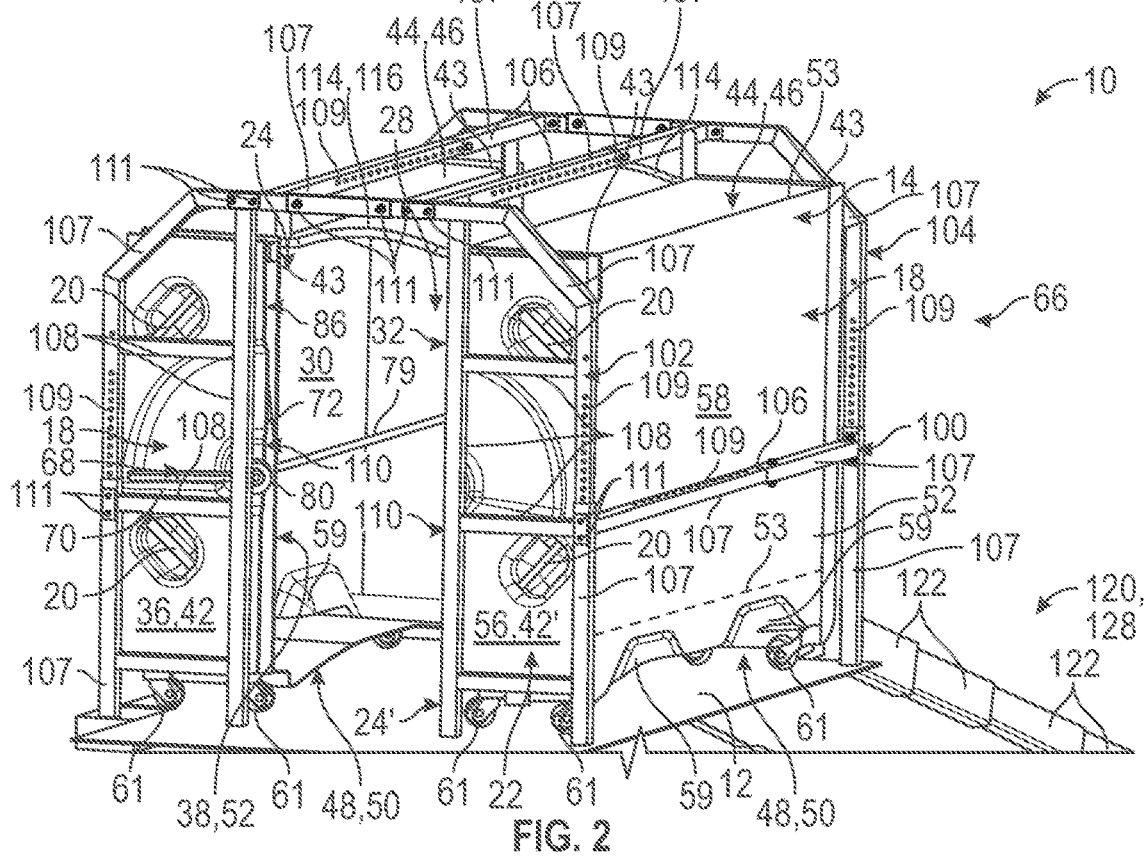
FIG. 2 is a partial perspective front view of the modular portable storage container system of FIG. 1 according to an aspect of the present disclosure.
Figure 3:
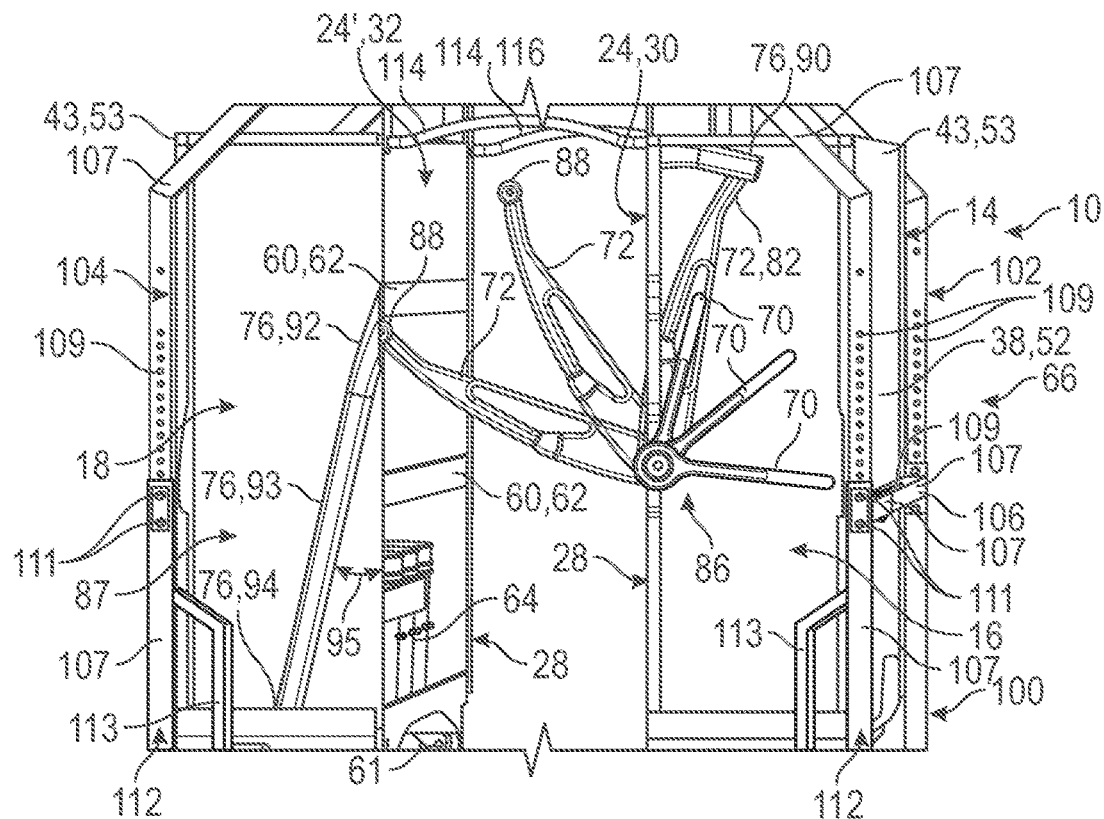
FIG. 3 is a partial perspective rear cutaway view of a portion of the modular portable storage container system of FIG. 1 in an open position and showing articulation of a lock arm according to an aspect of the present disclosure.
Figure 4:
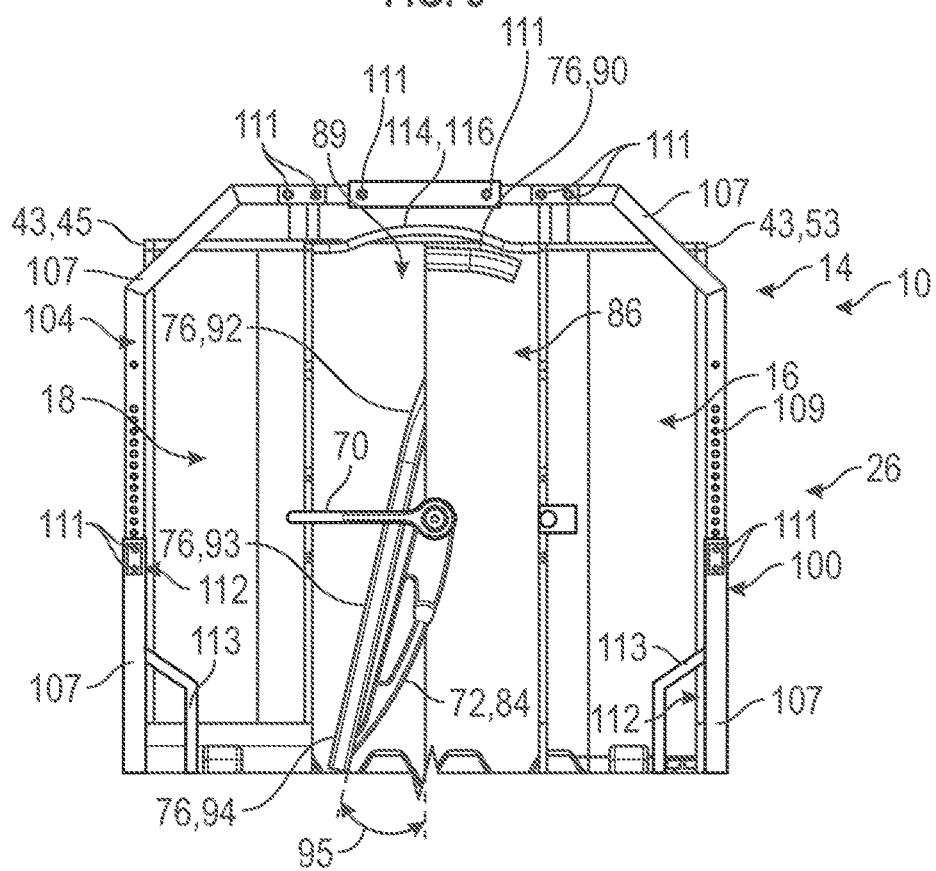
FIG. 4 is a partial rear cutaway view of a portion of the modular portable storage container system of FIG. 3 in a closed position and showing the lock arm in a locked position according to an aspect of the present disclosure.
Figure 5:
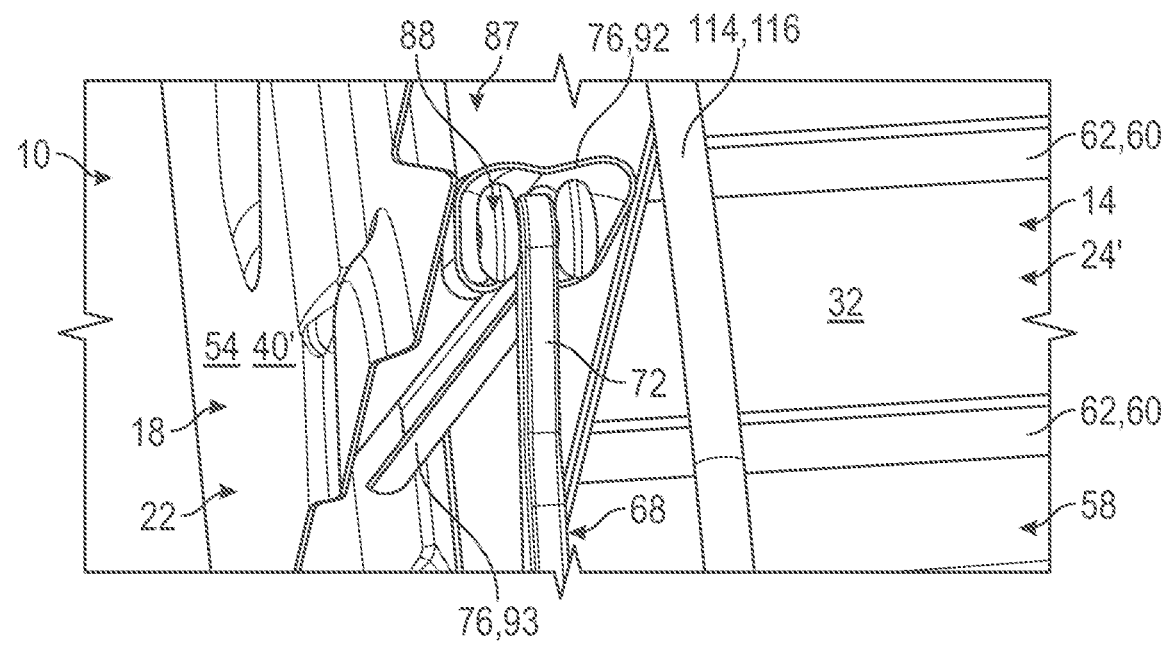
FIG. 5 is a partial perspective cutaway view of the modular portable storage container system of FIG. 3 showing a fluted portion of a lock track and the lock arm partially engaged therewith according to an aspect of the present disclosure.
Figure 6:
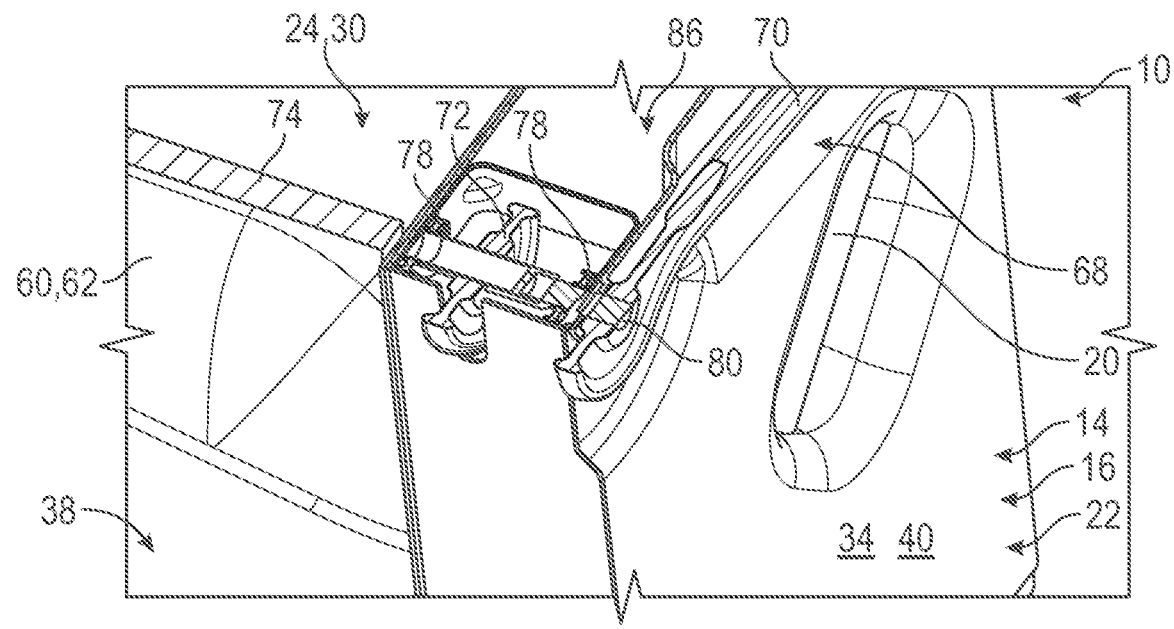
FIG. 6 is a partial perspective cutaway view of the modular portable storage container system of FIG. 3 showing a cross section of a portion of a lock handle and pivot shaft according to an aspect of the present disclosure.

Referring to FIGS. 1 and 2, a modular portable storage container system 10 is shown. The system 10 is sized and shaped to fit within a vehicle (not specifically shown). The vehicle may be any of a wide variety of vehicles such as cars, vans, trucks, busses, motor homes, semi trucks and/or trailers, trains, aircraft, spacecraft, watercraft, or any other such vehicle without departing from the scope or intent of the present disclosure. More specifically, the system 10 is sized and shaped to fit within a vehicle cargo compartment (not specifically shown except for cargo floor 12). The system 10 is portable and can be moved or manipulated from place to place by one or more people, or by automated means. The system 10 includes a modular storage container 14 composed of at least a first container section 16 and a second container section 18.

In the context of the modular portable storage container system 10 and vehicle cargo compartments into which the system 10 is designed to fit, the terms "forward", "rear", "inner", "inwardly", "outer", "outwardly", "above", and "below" are terms used relative to the orientation of a vehicle as shown in the drawings of the present application. Thus, "forward" refers to a direction toward a front of a vehicle, "rearward" refers to a direction toward a rear of a vehicle, "inner" and "inwardly" refers to a direction towards the interior of a vehicle, and "outer" and "outwardly" refers to a direction towards the exterior of a vehicle, "below" refers to a direction towards the bottom of the vehicle, and "above" refers to a direction towards a top of the vehicle.

The terms "top", "overtop", "bottom", "side" and "above" are terms used relative to the orientation of storage container 14 as shown in the drawings of the present application. Thus, while the orientation of the storage container 14 may change with respect to a given use, these terms are intended to still apply relative to the orientation of the components of the storage container 14 as shown in the drawings.

The storage container 14 may be used in a variety of different applications without departing from the scope or intent of the present disclosure. For example, the storage container 14 may be used in a warehouse or factory setting to move items from one area of the warehouse or factory to another. The storage container 14 may likewise be used in delivery applications in which the storage container 14 is loaded with items at one location. Subsequently, the storage container 14 is moved into the vehicle cargo compartment, secured therein, and then transported by the vehicle to another location where the storage container 14 or the contents thereof are delivered to the new location.

In order to move or manipulate the storage container 14 from place to place, including into and out of vehicle cargo compartments, one or more handles 20 are built into an exterior surface 22 of the storage container 14. The handles 20 may be moulded unitarily with the storage container 14, or the handles 20 may be affixed to the storage container 14 by known means such as mechanical fasteners including bolts, nuts, rivets, screws, interference fittings, and the like, and/or thermal or chemical fastening means such as welding, braising, glues, or the like. The handles 20 shown in FIGS. 1 and 2 are angled with respect to the horizontal to provide an ergonomic hand-position or grip for a person or people moving the storage container 14, however, it should be appreciated that the angles shown are merely exemplary and not intended to be limiting. In some examples, the handles 20 may be completely horizontal, completely vertical or angled anywhere in between. Likewise, the handles 20 shown are linear, but could also be curved, angular, or the like without departing from the scope or intent of the present disclosure. In some examples, in which the storage container 14 is moved from place to place solely by automated means, the handles 20 may adapted as a keyway for a robotic or otherwise automated assembly to movably attach to and manipulate or move the storage container 14 from location to location. Additional handles 20, keyways, or other such features may be disposed at locations other than those shown in the figures without departing from the scope or intent of the present disclosure.

As shown in FIGS. 1 through 4, the first and second container sections 16, 18 define rectilinear prisms each having an open side 24. Put differently, the first and second container sections 16, 18 of FIGS. 1 and 2 are shaped generally like open-sided rectangular boxes. In several aspects, the first and second container sections 16, 18 are substantially identical to one another. In some examples, the first and second container sections 16, 18 define mirror images of one another. The open side 24 of the first container section 16 and the open side 24' of the second container section face each other so that when the first and second container sections 16, 18 are placed into contact with one another in a closed position 26, the first and second container sections 16, 18 surround, enclose, and define a full volume 28 of storage space. That is, the first container section 16 defines a first partial volume 30 of storage space, and the second container section 18 defines a second partial volume 32 of storage space, the first and second partial volumes 30, 32 of storage space combining to define the full volume 28 of storage space.

Each of the first and second container sections 16, 18 may be made of a wide variety of different materials, including metals, alloys, plastics, vinyls, composite materials, and the like. In one particular example, the first and second container sections 16, 18 are made in a vacuum formed injection molding process out of a plastic material such as polytetrafluoroethylene (PTFE), or the like. In another specific example in which the modular storage container system 10 is used in food or medical applications, the materials of the first and second container sections 16, 18 and many or all of their components are composed of known food safe or medical grade materials. The material of the first and second container sections 16, 18 are at least partially solid, hollow, corrugated or a honeycomb material, or the like without departing from the scope or intent of the present disclosure.

The first and second container sections 16, 18 of some examples are made of several distinct modular components. In one example, the first container section 16 is formed of a modular first end portion 34, a modular second end portion 36, and a modular first wall portion 38. The first end portion 34 defines a rear end 40 of the first container section 16, while the second end portion 36 defines a front end 42 of the first container section 16, with the modular first wall portion 38 extending therebetween. That is, the first and second end portions 34, 36 are substantially planar and parallel to one another, while the first wall portion 38 is orthogonal to each of the first and second end portions 34, 36. The first end portion 34 contacts the first wall portion 38 at a connection surface 43 where fastening means are employed to secure the first end portion 34 to the first wall portion 38. Likewise, the second end portion 36 contacts the first wall portion 38 at a connection surface 43 where fastening means are employed to secure the second end portion 36 to the first wall portion 38. The fastening means, while not specifically shown, may include mechanical fasteners including bolts, nuts, rivets, screws, press-fit fasteners, clasps, interference fittings, or the like, or by and/or thermal or chemical fastening means such as welding, braising, glues, or the like.

In some examples, the first wall portion 38 is composed of multiple modular sections or components such as a modular top section 44 forming an enclosing top 46 of the first wall portion 38, a horizontal bottom or base portion 48 forming an enclosing bottom 50 of the first wall portion 38, and a vertical wall 52. Each of the base portion 48, top section 44, and vertical wall 52 are connected by one or more fastening means as described above. More specifically, the top section 44, base portion 48 and vertical wall 52 contact one another at one or more connection surfaces 53, where the fastening means are employed to secure the modular top section 44, base portion 48, and vertical wall 52 together. In further examples, the first wall portion 38 may be a unitary construction or molding having a substantially rectangular "C"-shaped cross section defining the modular top section 46, base portion 48, and vertical wall 52 portions.

Like the first container section 16, the second container section 18 is formed of a modular third end portion 54, a modular fourth end portion 56, and a modular second wall portion 58. The third end portion 54 contacts the second wall portion 58 at a connection surface 43 where fastening means as described above are employed to secure the third end portion 54 to the second wall portion 58. Likewise, the fourth end portion 56 contacts the second wall portion 58 at a connection surface 43 where fastening means are employed to secure the fourth end portion 56 to the second wall portion 58.

The third end portion 54 defines a rear end 40' of the second container section 18, while the fourth end portion 56 defines a front end 42' of the second container section 18, with the modular second wall portion 58 extending therebetween. The second wall portion 58 may be composed of a variety of modular components similar to those described above with respect to the first wall portion 38, or like the first wall portion 38, may be composed of a single unitary moulding or the like.

In several aspects, the base portion 48 of each of the first and second container sections 16, 18 has a concave arcuate shape extending from the first end portion 34 to the second end portion 36 of the first wall portion 38, and extending from the third end portion 54 to the fourth end portion 56 of the second wall portion 58. The concave arcuate shape of some examples is interrupted by at least two inset sections 59 sized and shaped to fit around wheel well intrusions in a vehicle cargo compartment. The two inset sections 59 allow for the storage container 14 to be loaded into a vehicle cargo compartment in either direction without fouling against the wheel well intrusions in the vehicle cargo compartment. That is, the front and rear ends 42, 42' and 40, 40' of the storage container 14 are reversible such that the storage container 14 can be loaded into the vehicle cargo compartment in in either a "forward" or "backward" direction. The base portion 48 further includes a plurality of wheels or casters 61. The casters 61 of some examples are disposed on a bottom surface 63 of the base portion 48 and provide the first and second container sections 16, 18 the ability to roll from place to place. The casters 61 are attached to the base portion 48 by known means such as mechanical fasteners including bolts, nuts, rivets, screws, press-fit fasteners, clasps, interference fittings, or the like. In several aspects, the casters 61 are made of one or more materials including but not limited to: metals, alloys, plastics, vinyls, composite materials, and the like.

In some aspects, the fastening means may also be movable devices such as hinges, accordion-folded attachments, or the like. Likewise, some or all of the first and second wall portions 38, 58 and the first, second, third, and fourth end portions 34, 36, 54, 56, and the top sections 46 and base portions 48 may be made up of multiple independent sections hinged, accordion-folded, or otherwise movably attached to one another. In an example of a food truck, one or more of the first and second wall portions 38, 58 may be formed of two longitudinally-extending sections, one disposed overtop the other and attached to one another at a horizontal hinge. The longitudinally-extending section disposed towards the top section 46 is thereby allowed to rotate downwards and towards the base portion 48, thus forming an opening through which food or other materials may be passed from the interior of the vehicle cargo compartment to customers outside the vehicle. Similarly, in a camping situation, the multiple independent sections may be expandable via accordion-fold attachments to allow the storage compartment 14 to be expanded substantially beyond the dimensions of the vehicle cargo compartment when the storage compartment 14 is outside the vehicle cargo compartment and unlocked.

The first and second partial volumes 30, 32 of storage space within the first and second container sections 16, 18 may be organized or sub-divided in a variety of different ways using modular organizational components 60. The organizational components 60 are affixed to the first and second container sections 16, 18 by any of a variety of known fastening means, such as mechanical fasteners including bolts, nuts, rivets, screws, press-fit fasteners, clasps, interference fittings, or the like. In the example of FIG. 1, the second partial volume 32 of storage space within the second container section 18 is divided by one or more shelves 62. The shelves 62 may be attached to the modular third and fourth end portions 54, 56, and/or the second wall portion 58 of the second container section 18.

In some aspects, some of the shelves 62 extend fully from the third end portion 54 to the fourth end portion 56. In other aspects, some shelves 62 extend only part of the distance between the third end portion 54 and the fourth end portion 56, thereby providing increased vertical space for stowage of tall items such as buckets 64, bar stock, brooms, shovels, or the like. Similar shelves 62 or other such structures may be affixed within the first partial volume 30 of storage space in the first container section 16. While in the foregoing, shelves 62 have been described as a means of organization within the first and second partial volumes 30, 32 of storage space, it should be appreciated that shelves 62 are intended as a non-limiting example. Other organizational structures may be used in one, the other, or both of the first and second partial volumes 30, 32 without departing from the scope or intent of the present disclosure. In several examples, additional or different organizational components 60 used may include shelves 62, cabinets, walls, drawers, hooks, bars, cages, clothes racks, or any of a variety of other such organizational components 60 without departing from the scope or intent of the present disclosure. Furthermore, the organizational components 60 may have particular adaptations for a given purpose. For example, some shelves 62 may be equipped with a lip, edge, or recesses for spill prevention, liquid retention, or the like. Likewise, the same types of organizational components 60 may be used in each of the first and second container sections 16, 18, or the first and second container sections 16, 18 may each have unique organizational components 60 disposed therein.

Turning now more specifically to FIGS. 3-6 and with continuing reference to FIGS. 1-4, the first and second container sections 16, 18 are movable relative to one another between at least the closed position 26 and an open position 66. In the open position 66, the first and second container sections 16, 18 are effectively independent of one another, and may be moved entirely separately from one another. In an example, the first and second container sections 16, 18 may be loaded with cargo, for example, buckets 64, packages for delivery (not specifically shown), or the like in entirely different locations within a factory or warehouse. The first and second container sections 16, 18 may then be moved to a single location for loading into delivery vehicles, at which time, the first and second container sections 16, 18 are moved into the closed position 26 and loaded into a vehicle together. In order to secure the first and second container sections 16, 18 together, the storage container 14 has a locking mechanism 68.

The locking mechanism 68 has four primary components: a lock handle 70, a lock arm 72, a pivot shaft 74, and a lock track 76. As shown in the drawings, in several aspects, each of the first and second container sections 16, 18 includes distinct portions of the locking mechanism 68, however, it should be appreciated that variations in which each of the first and second container sections 16, 18 includes all of the locking mechanism 68 components are intended to be included in the scope of the present disclosure. One copy of the locking mechanism 68 is described in further detail below, however, it should be appreciated that the storage container 14 may be equipped with a single locking mechanism 68 or any number of additional locking mechanisms 68 without departing from the scope or intent of the present disclosure. For example, the locking mechanism 68 may be located only at the front and rear ends 42, 42' and 40, 40' of the storage container 14, at only one of the front and rear ends 42, 42', 40, 40' or there may be additional locking mechanisms 68 disposed throughout the storage container 14, such as within a dividing wall (not specifically shown) disposed within the storage container 14 and parallel to the end portions 34, 36, 54, 56 of the storage container 14. In a particular example, a first locking mechanism 68' is disposed at the front end 42, 42' of the storage container 14, and a second locking mechanism 68" is disposed at the rear end 40, 40' of the storage container 14.

Figure 7:
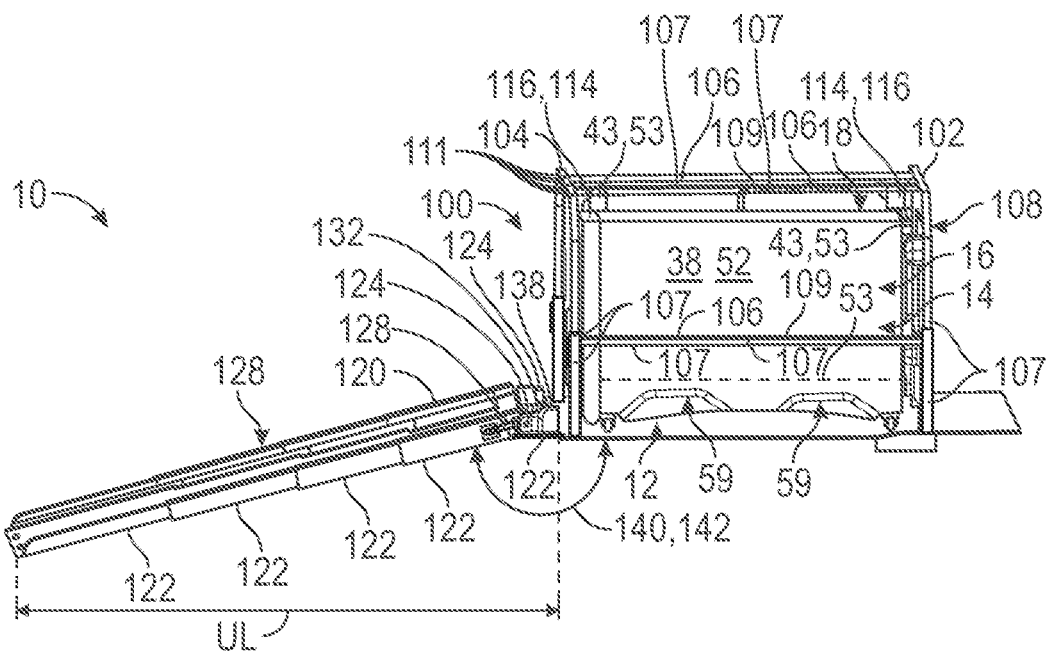
FIG. 7 is a perspective side view of the modular portable storage container system of FIG. 1 showing a ramp in an extended according to an aspect of the present disclosure.

The pivot shaft 74 is a horizontally and longitudinally-disposed cylindrical rod, torsion tube, or torque tube that is freely rotatable within a set of bearings 78 disposed in the first and second end portions 34, 36 of the first container section 16. The pivot shaft 74 defines an axis of rotation for the lock handle 70, and lock arm 72. In food and/or medical applications, the bearings 78 are food safe or medical grade sealed bearings 78. More specifically, as shown in FIG. 7, the pivot shaft 74 extends fully from a point exterior to the first end portion 34, through the first end portion 34, through the first partial storage volume 30 through the second end portion 36 to a point exterior to the second end portion 36. In several aspects, the pivot shaft 74 extends through a portion of one or more of the shelves 62. The external extremities or ends 80 of the pivot shaft 74 engage with and are fixed for common rotation with lock handles 70. Similarly, the lock arm 72 is fixed for common rotation with the pivot shaft 74. The lock handle 70, lock arm 72, and pivot shaft 74 are rotatable between at least an unlocked position 82 and a locked position 84. The lock arm 72 is located at least partially within a hollow area 86 formed within each of the first and second end portions 34, 36. The lock arm 72 extends radially outwardly from the pivot shaft 74 to a roller assembly 88. The roller assembly 88 is sized and shaped to fit within and engage with the lock track 76.

In several aspects, the lock track 76 is a roll-formed component formed of galvanized steel, aluminum, composite materials, or the like. The lock track 76 of some examples includes at least three separate sections, at least two of which are disposed in a second hollow area 87 formed the second container section 18, while the third is disposed in the hollow area 86 of the first container section 16. More specifically, the lock track 76 within the first container section 16 consists of a curvilinear storage section 90. The storage section 90 is disposed within the first and second end portions 34, 36. The curvilinear storage section 90 forms an arc section of a substantially circular section of lock track 76 that is substantially identical in radius to the distance defined by the length of the lock arm 72 between the pivot shaft 74 and the roller assembly 88. When the lock arm 72 is in the unlocked position 82, the roller assembly 88 is disposed within the storage section 90 of lock track 76 within the first container section 16, and the first and second container sections 16, 18 are freely movable relative to one another.

By contrast, when the open side 24 of the first container section 16 and the open side 24' of the second container section 18 are facing one another, and the first and second container sections 16, 18 are correctly spaced apart from one another, the lock arm 72 can be rotated to engage with the two remaining lock track 76 sections. The two remaining lock track sections 76 are disposed in the second container section 18, and specifically within the third and fourth end portions 54, 56. The remaining lock track 76 sections are a fluted open portion 92 and a closed end portion 94 with a continuous track portion 93 disposed therebetween. The fluted open portion 92 is a curvilinear section of the lock track 76 which opens towards the first container section 18 and is located at a height below the height at which the curvilinear storage section 90 is disposed within the first container section 16. In several aspects, the fluted open portion 92 has larger and/or wider dimensions at the portion facing and proximate the first container section 16 and narrows to a smaller and/or narrow set of dimensions at a portion farther within the second container section 18 and farther away from the first container section 16. The fluted open portion 92 is thus sized and shaped to capture the roller assembly 88 of the lock arm 72 as the lock arm 72 is rotated towards the second container section 18 from the unlocked position 82 towards the locked position 84. The fluted or widened shape of the fluted open portion 92 allows for some positioning error of the first and second container sections 16, 18 relative to one another without disrupting the efficacy of the locking mechanism 68. In several aspects, farther from the first container section 16, and deeper within the second container section 18, the fluted open portion 92 straightens into a less acutely curved section of the lock track 76.

At its farthest extent within the second container section 18, the fluted open portion 92 meets the continuous track portion 93 of the lock track 76. The continuous track portion 93 has a substantially consistent cross-sectional size along its entire length all the way from the fluted open portion 92 to the closed end portion 94. The continuous track portion 93 is a substantially linear section of lock track 76 which extends at an angle 95 downwards and away from the first container section 16. The closed end portion 94 is disposed at a downward-most end of the continuous track portion 93 proximate the base portion 48 of the second container section 18. The precise angle 95 at which the continuous track portion 93 extends downwards and away from the first container section 16 may vary from application to application without departing from the scope or intent of the present disclosure. As the lock arm 72 is moved from the unlocked position 82 to the locked position 84, the lock arm 72 traverses the space between the first and second container sections 16, 18 and the roller assembly 88 is captured by the fluted open portion 92. Once captured, the roller assembly 88 is centered by and rolls within the fluted end portion 92 downwards, through the continuous track portion 93 and towards the closed end portion 94. As a user continues to actuate the lock handle 70 from the unlocked position 82 towards the locked position 84 while the roller assembly 88 is in the fluted open portion 92, the fluted open portion 92 directs the roller assembly 88 into the continuous track portion 93, and eventually to the closed end portion 94. The downward angle 95 at which the continuous track portion 93 extends causes the roller assembly to exert a closing force "F" between the lock track 76 and the pivot shaft 74, thereby drawing the first and second container sections 16, 18 closer together. As the roller assembly 88 of the lock arm 72 approaches the terminus of the closed end portion 94 proximate the base portion 48 of the second container section 18, the first and second container sections 16, 18 are drawn forcibly into contact with one another such that the first and third end portions 34, 54, and the second and fourth end portions 36, 56 are in contact with one another. Likewise, the base portions 48 and the top sections 46 of each of the first and second container sections 16, 18 are drawn into contact with one another in the locked position 84. Additional locking features such as padlocks, pins, locking rings, or the like may then retain and secure the lock handle 70, and/or the lock arm 72, and/or the pivot shaft 74 and therefore the entire locking mechanism 68 in the locked position 84. When locked, the additional locking features prevent accidental or unwanted movement of the first and second sections 16, 18 relative to one another. In several aspects, because the locking mechanism 68 is disposed at both the front and rear ends 42, 42' and 40, 40' of the storage container 14, the locking mechanism 68 rigidly retains the first and second container sections 16, 18 against one another, allowing the storage container 14 to be moved from place to place without the container sections 16, 18 separating from one another.

The modular portable storage container system 10 further includes a blocking frame 100. The blocking frame 100 is sized and shaped to fit within a vehicle cargo compartment and secures the first and second container sections 16, 18 within the cargo compartment. Accordingly, the precise size and shape of the blocking frame 100 may therefore vary substantially from application to application, as the size and shape of a particular cargo compartment may vary substantially from vehicle to vehicle. The blocking frame 100 is immovably secured within the cargo compartment by known means, such as mechanical fasteners including bolts, nuts, rivets, screws, interference fittings, and the like, and/or thermal or chemical fastening means such as welding, braising, glues, or the like. In some examples, multiple blocking frames 100 may be used in a single cargo compartment, while in other examples, only a single blocking frame 100 may be necessary. The blocking frame 100 can be made of a number of different types of materials, and in a variety of different manufacturing processes without departing from the scope or intent of the present disclosure. In several aspects, the blocking frame 100 consists primarily of a front frame portion 102 connected to a rear frame portion 104 by a plurality of longitudinal bars 106. The front frame portion 102, rear frame portion 104 and longitudinal bars 106 of one example are metal extrusions, castings, or the like and are secured to one another by known means such as mechanical fasteners including bolts, nuts, rivets, screws, interference fittings, and the like, and/or thermal or chemical fastening means such as welding, braising, glues, or the like.

In several aspects, the blocking frame 100 is expandable. The expandable nature of the blocking frame 100 allows similar or identical blocking frame 100 components to be manufactured for use in a variety of applications. That is, because the blocking frame 100 of some examples is expandable, the same blocking frame components may be used in a space-efficient manner within a vehicle cargo compartment having a volume substantially smaller than the volume of a second vehicle cargo compartment. However, the expandable blocking frame 100 allows the same front and rear frame portions 102, 104 and longitudinal bars 106 in an expanded position within the second vehicle cargo compartment as well. Likewise, the expandable blocking frame 100 allows the same blocking frame 100 assembly with storage containers 14 of varying sizes for use in different applications. That is, the expandable blocking frame 100 is expandable from a first configuration to a second configuration having dimensions substantially larger than the first configuration, or any of a variety of configurations therebetween.

More specifically, in an expandable example of the blocking frame 100, each of the front frame portion 102, rear frame portion 104, and longitudinal bars 106 is composed of interlocking frame segments 107. In the example shown in the figures, the interlocking frame segments 107 are telescoping bar portions having a plurality of detents 109 and locking pins 111. The locking pins 111 may be any of a variety of known pin-like features including, but not limited to: bolts and nuts, rivets, screws, interference fittings, press-fit fasteners, spring pins, cotter pins, screws, or the like. The locking pins 111 are sized and shaped to interact with the detents 109 to secure interlocking frame segments 107 of the front frame portion 102, and/or rear frame portion 104 and/or longitudinal bars 106 to other interlocking frame segments 107 of each of the front, rear, and longitudinal bar 102, 104, 106 portions of the blocking frame 100.

Each of the plurality of detents 109 is spaced apart from the next of the plurality of detents 109 by a predetermined distance. In a particular example, the spacing between each of the plurality of detents 109 is approximately one inch. However, it should be appreciated that in a one inch separation between the detents 109 is merely intended to be an exemplary arrangement, and variations in distance between the detents 109 of other examples are intended to be within the scope of the present invention. In still further examples, the interlocking frame segments 107 may be attached to one another by any of a variety of known movable but lockable mechanisms, including but not limited to the above-described detents 109 and locking pins 111, as well as hinges, press-fit locking features, or the like.

The front frame portion 102 is disposed towards the front of the vehicle cargo compartment and includes one or more blocking members 108 forming a narrow door frame 110. The narrow door frame 110 is sized to allow a user, such as a vehicle driver or an automated robotic device to pass at least partially through the narrow door frame 110 to access the storage container 14. However, even when the storage container 14 is in the closed position 26, the storage container 14 is too wide to fit through the narrow door frame 110. That is, the blocking members 108 prevent longitudinal movement of the storage container 14, and even the first and second container sections 16, 18 within the vehicle cargo compartment while also allowing a user to pass into a space between the first and second container sections 16, 18 when the first and second container sections 16, 18 are in the open position 66.

The rear frame portion 104 is disposed towards the rear of the vehicle cargo compartment and defines a wide door frame 112. The wide door frame 112 is larger, and specifically significantly wider than the narrow door frame 110. The wide door frame 112 is sized to allow passage of the storage container 14 when the first and second container sections 16, 18 are in the closed position 26. In some examples, the rear frame portion 104 further includes one or more leg portions 113. The leg portions 113 extend laterally inward and towards a centerline of the vehicle cargo compartment. In several aspects, the leg portions 113 are spaced apart by a distance sufficient to allow passage of the storage container 14 when the first and second container sections 16, 18 are in the closed position 26.

The plurality of longitudinal bars 106 provide end-to-end support for the front and rear frame portions 102, 104 while spacing the front and rear frame portions 102, 104 apart by a distance substantially similar to, but slightly larger than longitudinal dimensions of the storage container 14.

The blocking frame 100 also has a lock bar 114. The lock bar 114 is rotatably mounted to the blocking frame 100 and is rotatable between a locked bar position 116 and an unlocked bar position 118. More specifically, the lock bar 114 is mounted to the blocking frame 100 approximately centrally above one or more of the narrow door frame 110 and the wide door frame 112, and extends laterally across a portion of the vehicle cargo compartment. The lock bar 114 may be manually or automatically operated without departing from the scope or intent of the present disclosure. In several aspects, when the lock bar 114 is in the unlocked bar position 118, the lock bar 114 is stowed up and proximate a ceiling (not specifically shown) of the vehicle cargo compartment. Thus, in the unlocked bar position 118, the storage container 14 in the closed or open positions 26, 66, may be moved freely within the blocking frame 100. However, when the first and second container sections 16, 18 are in the open position 66 and separated fully from one another such that the first and second container sections 16, 18 are up against the longitudinal bars 106 of the vehicle cargo compartment, the lock bar 114 may be freely moved into the locked bar position 116. In the locked bar position 116, the lock bar 114 is rotated downwards so that it defines a substantially vertical planar surface extending laterally across a portion of one or more of the narrow door frame 110 and the wide door frame 112. In the locked bar position 116, the lock bar 114 touches and engages with each of the first and second container sections 16, 18, and immobilizes the first and second container sections 16, 18, relative to one another and the blocking frame 100. Accordingly, in the locked bar position 116, the lock bar 114 retains the first and second container sections 16, 18 in the open position 66 within the cargo compartment of the vehicle, thereby allowing users access to contents of each of the first and second container sections 16, 18 while preventing lateral movement of the first and second container sections 16, 18 while the vehicle is in motion. Likewise, the front and rear frame portions 102, 104, and the longitudinal bars 106 prevent both longitudinal and lateral movement of the first and second container sections 16, 18 when the lock bar 114 is in the locked bar position 116.

In several aspects, the front and rear frame portions 102, 104, and the longitudinal bars 106, including the blocking members 108, and leg portions 113, may have shock absorption material disposed thereon. In some examples, the shock absorption material is composed of rubber, silicone, or other similarly flexible but semi-rigid materials. Likewise, the shock absorption material may be formed into nodes such as stoppers, padding, or the like. Furthermore, it should be appreciated that the shock absorption material is sized and shaped differently depending on the size and shape of the blocking frame 100, and the storage container 14. The shock absorption material holds or wedges the first and second container sections 16, 18 immovably in place within the vehicle cargo compartment when the lock bar 114 is in the locked position 116.

Figure 8:
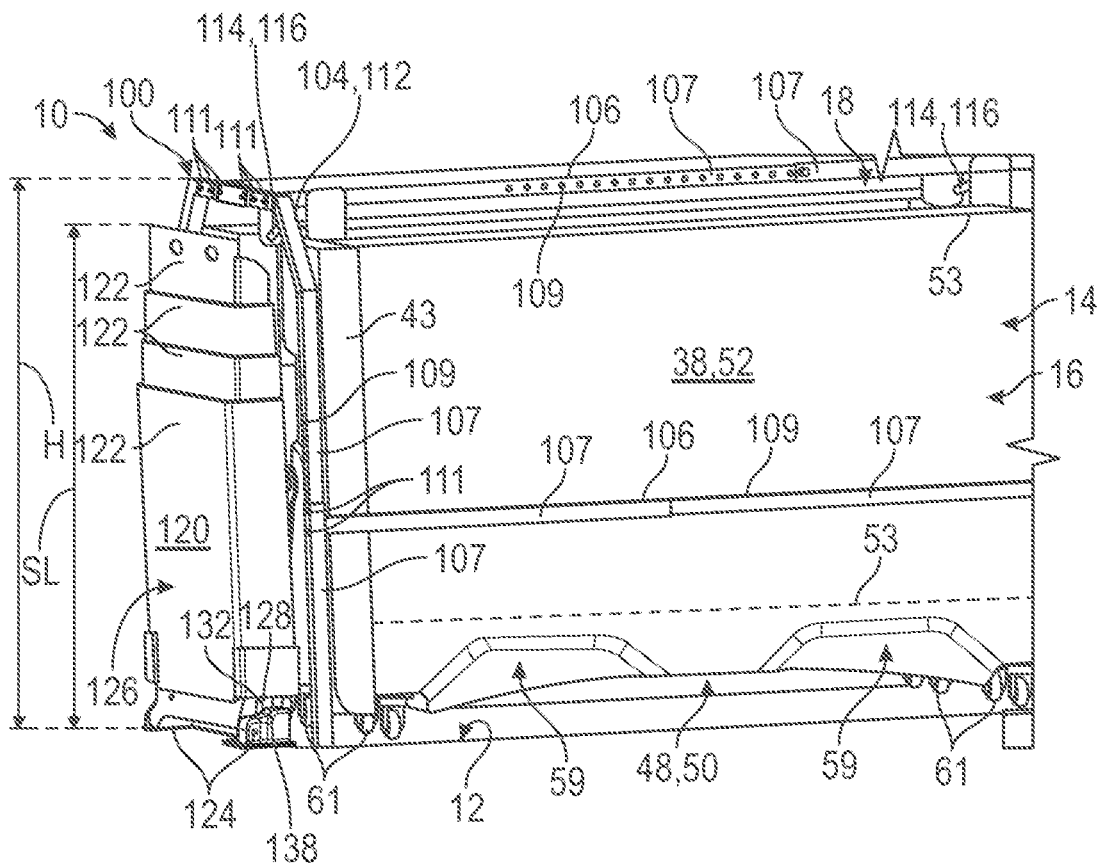
FIG. 8 is a partial perspective side view of the modular portable storage container system of FIG. 7 showing the ramp in an unextended or stowed position according to an aspect of the present disclosure.

Turning now to FIGS. 7 and 8, and with continuing reference to FIGS. 1-6, in some examples, the modular portable storage container system 10 further includes an extendable ramp 118. The extendable ramp 118 may vary in size, precise location, and the like depending on the particular application in which the extendable ramp 118 is used. In several aspects, the extendable ramp 120 has a plurality of extendable sections 122. The extendable sections 122 may be foldable relative to one another, or as shown in the figures, the extendable sections 122 may telescope relative to one another. At least one of the plurality of extendable sections 122 is rotatably affixed to a vehicle proximate a vehicle tailgate opening (not specifically shown), at one or more pivot points 124. Thus, the extendable ramp 118 can be rotated between at least a stowed position 126 and an unstowed position 128. In the stowed position 126, the extendable ramp 118 is positioned substantially vertically above the pivot points 124 and the extendable sections 122 are in an unextended or stowed state such that the extendable ramp 118 has a stowed length "SL" shorter than a height "H" of the blocking frame 100.

The pivot points 124 may be any of a variety of known rotating mechanisms, including hinges or the like without departing from the scope or intent of the present disclosure. However, in one particular example, the pivot points 124 include a spring-loaded locking pin 128 and a hinge base 130. The hinge base 130 is affixed to the vehicle on or proximate the cargo floor 12. The hinge base 130 defines the pivot point 124 itself, as well as a curvilinear ramp portion 132. The curvilinear ramp portion 132 extends from a rearward-facing portion 134 of the hinge base 130 to an upward-facing portion 136. A receiver 138 is formed in the upward-facing portion 136. The receiver 138 is sized and shaped to accept and retain the spring-loaded locking pin 128 therein when the ramp is in the stowed position 126. Thus, when the extendable ramp 118 is in the stowed position 126, the spring-loaded locking pin 128 fits into the receiver 138 thereby locking the extendable ramp 118 in place in the stowed position. A user can then pull up on or otherwise retract the spring-loaded locking pin 128 from the receiver 138 and rotate the extendable ramp 118 from the stowed position 126 to the unstowed position 128. Conversely, the spring-loaded locking pin 128 is biased into contact with the curvilinear ramp portion 132, and when the extendable ramp 118 is rotated from the unstowed position 128 to the stowed position 126, the spring-loaded locking pin 128 follows the curvilinear ramp portion to the upward-facing portion 136 where the spring-loaded locking pin 128 automatically engages with the receiver 138.

In the unstowed position 128, the extendable ramp 118 can be extended from the stowed length SL to an unstowed length "UL". The unstowed length UL may vary depending on the particular situation in which the extendable ramp 118 is being used. For example, at a loading dock, the extendable ramp 118 may not be fully extended, and may form a substantially horizontal surface from the loading dock lip (not specifically shown) to the cargo floor 12 of the cargo compartment of the vehicle. In another example, vehicle may be on level ground, and the extendable ramp 118 may be unstowed to a position below the horizontal such that each of the extendable sections 122 is maximally extended and where the unstowed length UL substantially greater than the stowed length SL. In the latter example, the concave arcuate shape of the base portion 48 is sized and shaped to pass over a hump 140 defining a slope or angle 142 of the extendable ramp 118 relative to the floor 12 of the cargo compartment, such that the base portion 48 does not contact or get hung up on the extendable ramp 118, the floor 12, or hump 140 at which the floor 12 and extendable ramp 118 meet. In several aspects, the extendable ramp 118 is equipped with a variety of latching mechanisms which, when the extendable ramp 118 is in the unstowed position 128, lock the extendable sections 122 in place relative to one another. The latching mechanisms may be any of a variety of known or novel latching mechanisms including but not limited to: cotter pins, spring pins, clamps, spring clamps, spring loaded hinges, or the like.

The modular nature of the portable storage container system 10 allows for storage containers 14 of varying sizes, shapes, and the like for use in industrial applications, as well as in personal or private use. The storage containers 14 and blocking frames 100 may be sized for use in semi trucks, tractor trailers, delivery vans, mail trucks, station wagons, train cars, or the like without departing from the scope or intent of the present disclosure. For some examples, the storage containers 14 and blocking frames 100 may be used in portable power station applications with a generator housed in one of the first and second container sections 16, 18 and electrical or fuel ancillaries housed in the other of the first and second container sections 16, 18. Likewise, the storage containers 14 and blocking frames 100 may be used in camping situations where the storage containers 14 are pre-loaded with camping gear (i.e. tents, tables, sleeping rolls and bags, portable stove, cookware, and the like) and unstowed from a vehicle at a campsite where the first and second container sections 16, 18 are separated and their contents unstowed for users to access the camping equipment stored therein. In further examples, the first and second container sections 16, 18 may be adapted as refrigeration units for transport of food, medical supplies, mortuary units, or the like.

In some examples, multiple storage containers 14 may be placed into a single blocking frame 100 having additional lock bars 114 disposed therein. Likewise the modularity of the first and second end portions 34, 36 and third and fourth end portions 54, 56 and the first and second wall portions 38, 58 means that first and second wall portions 38, 58 having different lengths for differing applications may be used with the same first, second, third, and fourth end portions 34, 36, 54, 56. Likewise, first, second, third, and fourth end portions 34, 36, 54, 56 having different widths for differing applications may be used with the first and second wall portions 38, 58 having lengths optimized for a particular application. That is, the modularity of each of the first, second, third, and fourth end portions 34, 36, 54, 56, and the first and second wall portions 38, 58 allows the same fundamental components to be used in a wide variety of different applications. of the present disclosure offers several advantages.

Furthermore, the first, second, third, and fourth end portions 34, 36, 54, 56 may be equipped as described above with a keyway or coupling mechanism. The coupling mechanism (not specifically shown) may be used to couple a storage container 14 to one or more other storage containers 14 to form a train of multiple storage containers 14. The coupling mechanism may be any of a variety of coupling mechanisms including but not limited to: Janney couplers, screw couplings, knuckle couplings, drawbars, pins and sockets, ball hitches, gooseneck hitches, pintle hitches, receiver hitches, hinged or rigid or flexible arms with coupling components, or the like. Trains of storage containers 14 can be used in warehouse applications to move quantities of goods from location to location. In further examples, the coupling mechanism may be separate from the keyway and may instead be formed in or mounted to each of the first and second container sections 16, 18, such that the first and second container sections 16, 18 may be moved separately from one another. In the latter example, the first and second container sections 16, 18 may be loaded with different materials or cargo at completely different locations within a factory or warehouse setting, or the like. The first and second container sections 16, 18 may then be manually or automatically moved from their distinct locations within the factory to a central location where the first and second container sections 16, 18 are joined together in the locked position 84 for loading into a cargo compartment of a transport vehicle.

The first and second container sections 16, 18, and/or the storage container 14 itself of some examples are stackable. That is, multiple first container sections 16 may be stacked atop one another, multiple second container sections 18 may be stacked atop one another, and/or multiple complete storage containers 14 may be stacked atop one another. In several aspects, in instances where the first and second container sections 16, 18, and/or storage container 14 are stackable, the top sections 46 are shaped to accept and partially enclose the casters 61 of the first and second container sections 16, 18, and/or storage container 14 above. Similarly, the base portion 48 may have additional contours molded therein (not specifically shown). The additional contours may be adapted to accept lifting devices, such as fork-lift prongs, or the like. Similarly, the first and second end portions 34, 36 and wall portions 38 may be formed with recesses, protrusions, or other such features sized and shaped to allow engagement with moving devices such as fork-lifts, or the like. These recesses, protrusions or the like provide a simple way for a the storage containers 14 and/or separate first and second container sections 16, 18 to be moved from place to place.

A modular portable storage container system 10 of the present disclosure offers several advantages. In particular, the modularity of the storage container system 10 allows for use in a wide variety of different industrial, warehouse and private applications with relatively low cost of manufacturing and ease of scaling for different uses. Moreover, the modular portable storage container system 10 improves transit efficiency by providing a means for loading storage containers 14, warehousing the storage containers 14, moving the storage containers 14 into delivery and/or work or private vehicles, opening and securing the storage containers 14 within the cargo compartments of the vehicles with low effort and high portability, thereby increasing work efficiency for system 10 users.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A modular portable storage container system comprising:
    a first container section defining a first partial volume of storage space;
    a second container section defining a second partial volume of storage space, the first and second container sections movable between at least a closed position and an open position, wherein in the open position, the first and second container sections are separated from one another, and in the closed position the first and second container sections are in contact with one another such that the first and second partial volumes combine to define a full volume of storage space;
    a lock mechanism comprising:
        a lock arm disposed within the first container section;
        a lock handle disposed on the first container section;
        a pivot shaft defining an axis of rotation, the lock arm and lock handle fixed for common rotation with the pivot shaft, the lock arm extending radially outward from the pivot shaft to a roller assembly; and
        a lock track disposed within the second container section, the lock track extending from a fluted open portion to a closed end, with a continuous track portion disposed therebetween,
    wherein in the closed position, the roller assembly engages with the lock track and retains the first container section in contact with the second container section.

2. The modular portable storage container system of claim 1 wherein:
    the first container section further comprises a first end portion, a first wall portion, and a second end portion, wherein the first end portion is affixed at a first connection surface with the first wall portion, the first wall portion extends from the first connection surface to a second connection surface opposite the first connection surface, and wherein the second end portion is affixed to the first wall portion at the second connection surface so that the first end portion is disposed opposite and parallel to the second end portion; and the second container section further comprises a third end portion, a second wall portion, and a fourth end portion, wherein the third end portion is affixed at a third connection surface with the second wall portion, the second wall portion extends from the second connection surface to a fourth connection surface opposite the third connection surface, and wherein the third end portion is affixed to the second wall portion at the fourth connection surface so that the third end portion is disposed opposite and parallel to the fourth end portion.

3. The modular portable storage container system of claim 2 wherein the first wall portion and the second wall portion each further comprise:

a horizontal base portion; and a vertical portion positioned orthogonally overtop the horizontal base portion and affixed to the horizontal base portion, the horizontal base portion and the vertical portion extending from the first end portion to the second end portion of the first wall portion, and extending from the third end portion to the fourth end portion of the second wall portion.

4. The modular portable storage container system of claim 3 wherein the horizontal base portion further comprises:

a concave arcuate shape extending from the first end portion to the second end portion of the first wall portion, and extending from the third end portion to the fourth end portion of the second wall portion, wherein the concave arcuate shape further includes at least two inset sections sized and shaped to fit around wheel well intrusions in a vehicle cargo compartment so that the portable storage container is reversibly stowable within the vehicle cargo compartment.

5. The modular portable storage container system of claim 4 further comprising:

a ramp, the ramp having a plurality of extendable sections, at least one of the plurality of extendable sections is rotatably affixed to a vehicle proximate a vehicle tailgate opening, wherein the concave arcuate shape extending from the first end portion to the second end portion of the first wall portion, and extending from the third end portion to the fourth end portion of the second wall portion is sized and shaped to pass over an angle defining a slope of the ramp relative to a floor of the vehicle cargo compartment such that the horizontal base portion does not contact the ramp or the vehicle cargo compartment while the first and second container sections are moved.

6. The modular portable storage container system of claim 1 wherein at least a portion of the lock track is disposed within the first container section, and wherein the lock track in each of the first and second container sections is disposed within a hollow portion of the first and second container sections, respectively.

7. The modular portable storage container system of claim 1 further comprising:

a plurality of casters affixed to a bottom surface of each of the first and second container sections.

8. The modular portable storage container system of claim 1 further comprising:

a blocking frame, the blocking frame sized and shaped to fit within a vehicle cargo compartment and to secure the first and second container sections in the open position, the blocking frame further including a lock bar, wherein the lock bar is rotatably mounted to the blocking frame between the first and second container sections, and wherein the lock bar is rotatable between at least a locked position and an unlocked position.

9. The modular portable storage container system of claim 8 wherein in the locked position the lock bar physically contacts each of the first and second container sections to lock the first and second container sections in the open position and prevents lateral movement of the first and second container sections, and wherein in the unlocked position the lock bar rotates away from the first and second container sections to allow free movement of the first and second container sections.

10. The modular portable storage container system of claim 8 wherein the blocking frame further comprises:

a front frame portion;

a rear frame portion connected to the front frame portion by a plurality of longitudinal bars; and one or more blocking members forming a narrow door frame in the front frame portion, the one or more blocking members preventing longitudinal movement of the first and second container sections within a vehicle while allowing a user to pass into a space between the first and second container sections when the first and second container sections are in the open position, and wherein the rear frame portion defines a wide door frame, the wide door frame being larger than the narrow door frame, the wide door frame being sized to allow passage of the first and second container sections when the first and second container sections are in the closed position, and wherein the rear frame portion prevents longitudinal movement of the first and second container sections within a vehicle when the first and second containers sections are in the open position.

11. A modular portable storage container system comprising:

a portable storage container having at least a first container section and a second container section, the first container section defining a first partial volume of storage space and the second container section defining a second partial volume of storage space;

a lock mechanism comprising:
a lock arm disposed within the first container section;
a lock handle disposed externally to the first container section;
a pivot shaft defining an axis of rotation, the lock arm and the lock handle fixed for common rotation with the pivot shaft, the lock arm extending radially outward from the pivot shaft to a roller assembly; and
a lock track disposed within the second container section, the lock track extending from a fluted open portion to a closed end, with a continuous track portion disposed therebetween; and wherein the first container section and the second container section are movable between at least closed position and an open position, wherein in the closed position, the roller assembly engages with the lock track and retains the first container section in contact with the second container section.

12. The modular portable storage container system of claim 11 wherein in the open position, the first and second container sections are separated from one another, and in the closed position the first and second container sections are in contact with one another such that the first and second partial volumes combine to define a full volume of storage space.

13. The modular portable storage container system of claim 11 wherein:
   the first container section further comprises a first end portion, a first wall portion, and a second end portion, wherein the first end portion is affixed at a first connection surface with the first wall portion, the first wall portion extends from the first connection surface to a second connection surface opposite the first connection surface, and wherein the second end portion is affixed to the first wall portion at the second connection surface so that the first end portion is disposed opposite and parallel to the second end portion; and
   the second container section further comprises a third end portion, a second wall portion, and a fourth end portion, wherein the third end portion is affixed at a third connection surface with the second wall portion, the second wall portion extends from the second connection surface to a fourth connection surface opposite the third connection surface, and wherein the third end portion is affixed to the second wall portion at the fourth connection surface so that the third end portion is disposed opposite and parallel to the fourth end portion.

14. The modular portable storage container system of claim 13 wherein the first and second wall portions further comprise:
   a horizontal base portion; and
   a vertical portion positioned orthogonally overtop the horizontal base portion and affixed to the horizontal base portion, the horizontal base portion and the vertical portion extending from the first end portion to the second end portion of the first wall portion, and extending from the third end portion to the fourth end portion of the second wall portion.

15. The modular portable storage container system of claim 14 wherein the horizontal base portion further comprises:
   a concave arcuate shape extending from the first end portion to the second end portion of the first wall portion, and extending from the third end portion to the fourth end portion of the second wall portion; and
   a plurality of casters affixed to a bottom surface of the horizontal base portion, and
   wherein the concave arcuate shape further includes at least two inset sections sized and shaped to fit around wheel well intrusions in a vehicle cargo compartment so that the portable storage container is reversibly stowable within the vehicle cargo compartment.

16. The modular portable storage container system of claim 15 further comprising:
   a ramp, the ramp having a plurality of extendable sections, at least one of the plurality of extendable sections is rotatably affixed to a vehicle proximate a vehicle tailgate opening, wherein the concave arcuate shape of the horizontal base portion is sized and shaped to pass over an angle defining a slope of the ramp relative to a floor of the vehicle cargo compartment such that the horizontal base portion does not contact the ramp or the vehicle cargo compartment while the first and second container sections are moved.

17. The modular portable storage container system of claim 11 wherein the lock track further comprises:
   a storage section of lock track disposed within a hollow portion of the first container section; and
   wherein the fluted open portion, the continuous track portion, and the closed end are disposed within a hollow portion of the second container section.

18. The modular portable storage container system of claim 11 further comprising:
   a blocking frame, the blocking frame sized and shaped to fit within a vehicle cargo compartment and to secure the first and second container sections in the open position, the blocking frame further including a lock bar,
   wherein the lock bar is rotatably mounted to the blocking frame between the first and second container sections, the lock bar is rotatable between at least a locked bar position and an unlocked bar position, wherein in the locked bar position the lock bar physically contacts each of the first and second container sections to lock the first and second container sections in the open position and prevents lateral movement of the first and second container sections, and wherein in the unlocked bar position the lock bar rotates away from the first and second container sections to allow free movement of the first and second container sections.

19. The modular portable storage container system of claim 18 wherein the blocking frame further comprises:
   a front frame portion;
   a rear frame portion connected to the front frame portion by a plurality of longitudinal bars; and
   one or more blocking members forming a narrow door frame in the front frame portion, the one or more blocking members preventing longitudinal movement of the first and second container sections within a vehicle while allowing a user to pass into a space between the first and second container sections when the first and second container sections are in the open position, and
   wherein the rear frame portion defines a wide door frame, the wide door frame being larger than the narrow door frame, the wide door frame being sized to allow passage of the first and second container sections when the first and second container sections are in the closed position.

20. A modular portable storage container system comprising:
   a first container section and a second container section, the first and second container sections each defining a partial storage compartment, the partial storage compartments of the first and second container sections facing and spaced apart from one another in an open position, and the first and second container sections facing and in contact with one another and forming a complete storage compartment in a closed position;
   the first container section comprising:
      a first end portion;
      a first wall portion affixed to the first end portion at a first connecting surface;
      a second end portion affixed to the first wall portion at a second connecting surface, the first connecting surface disposed opposite the second connecting surface, wherein
      the first end portion and the second end portion of the first container section each have a first lock mechanism portion comprising:
         a rotatable handle;
         a pivot shaft defining an axis of rotation and extending from the rotatable handle disposed on the first end portion through the first wall portion to the rotatable handle disposed on the second end portion, the rotatable handles disposed on the first and second end portions each rotating about the pivot shaft and extending radially outward from the pivot shaft; and a lock arm disposed within a hollow portion of the first and second end portions and fixed for common rotation with the rotatable handle, and the pivot shaft, the lock arm extending radially outward from the pivot shaft and terminating at a roller assembly; and the second container section comprising:
- a third end portion;
- a second wall portion affixed to the third end portion at a third connecting surface;
- a fourth end portion affixed to the second wall portion at a fourth connecting surface, the third connecting surface disposed opposite the fourth connecting surface, wherein
- the third end portion and the fourth end portion of the second container section each have a second lock mechanism portion comprising:
  - a lock track disposed within a hollow portion of the third and fourth end portions, the lock track extending from a fluted open portion to a closed end, with a continuous track portion disposed therebetween; and wherein in the closed position, the roller assembly engages with the lock track and retains the first container section in contact with the second container section.

* * * * *